July 8, 1958

J. W. BURRESS 2,842,340

DRILL CARRIAGE

Filed Aug. 16, 1954

John W. Burress
INVENTOR.

July 8, 1958  J. W. BURRESS  2,842,340
DRILL CARRIAGE

Filed Aug. 16, 1954  5 Sheets-Sheet 3

John W. Burress
INVENTOR.

July 8, 1958

J. W. BURRESS 2,842,340

DRILL CARRIAGE

Filed Aug. 16, 1954

John W. Burress
INVENTOR.

BY Clarence A. O'Brien
and Harvey B. Jacobson
Attorneys

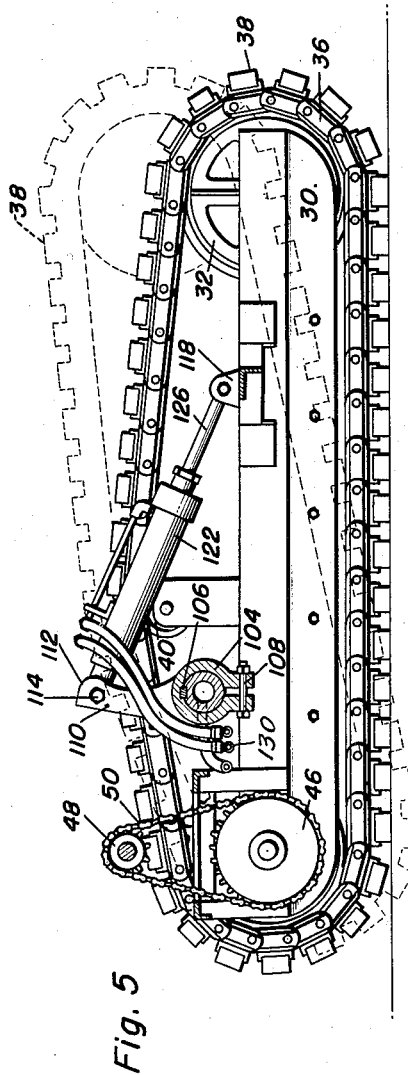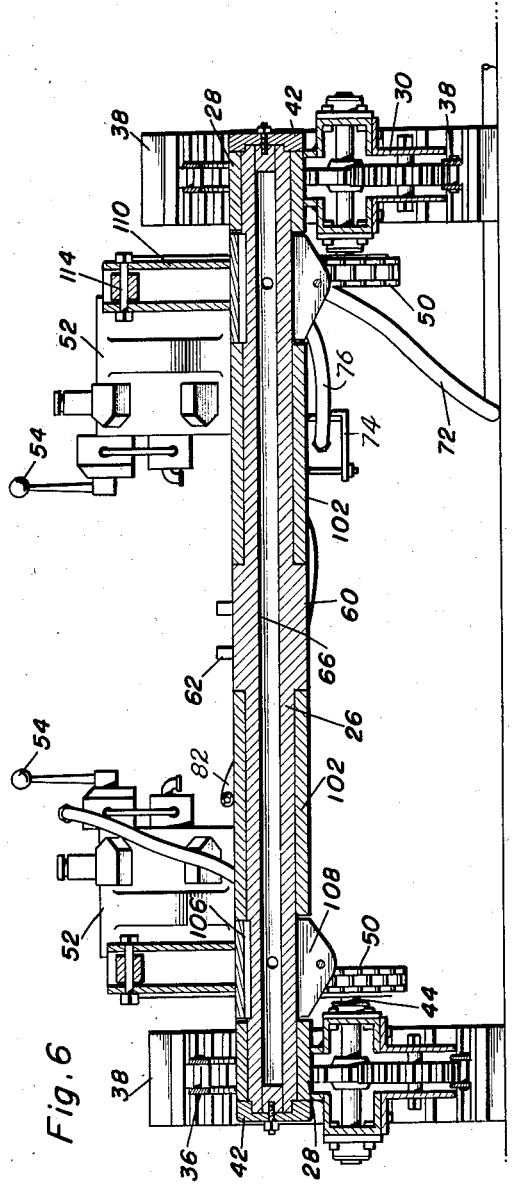

United States Patent Office 2,842,340
Patented July 8, 1958

2,842,340

DRILL CARRIAGE

John W. Burress, Roanoke, Va., assignor to Drill Carrier Corporation, Salem, Va., a corporation of Virginia Application August 16, 1954, Serial No. 450,069

12 Claims. (Cl. 255—51)

This invention relates to a wagon drill carriage and more specifically provides an improved mounting for a rock drill wherein the drill and the feeding mechanism therefor is supported in the desired position in a most satisfactory manner and yet may be moved to a new location in an expeditious manner.

An object of this invention is to provide a drill carriage mounted on endless trackways that form traction members for the carriage and are driven through the use of air operated motors.

Another object of this invention is to provide an improved drill carriage mounted on tread-like traction members wherein the traction members are movable in a vertical plane thereby retaining the drill in the desired position regardless of the slope of the supporting surface engaged by the traction members.

Another object of the invention is to provide an improved drill carriage mounted on tread-like traction members wherein the drill supporting arm may be adjusted to a predetermined angle and maintained in that position by fluid actuated means as the traction members move in separate vertical planes during the travel of the carriage over uneven ground.

Still another important object of the present invention is to provide a drill carriage having novel tubular construction therein that permits the passage of air to various air operated motors thereon thereby eliminating any excessive air hose and preventing any chaffing and pinching damage to said air hose.

A still further object of the present invention is to provide a drill carriage having a transverse axle mounting endless treads on each end thereof wherein the treads are independently movable about the axle in a vertical plane and the central portion of the axle is provided with an extending arm for supporting the drill, drill motor and drill control mechanism.

Yet another very important feature of the present invention is to provide a drill carriage that is operated by air motors wherein the carriage is provided with a drawbar for attachment of an air compressor thereby making the carriage self-driven thereby eliminating the use of a separate power instrument, such as a tractor, for moving the carriage to a desired location.

Other important features of the present invention will be found in its relatively simple construction, ruggedness, its adaptability to various terrains, its ability to be self-propelled, its ease of operation and its relatively inexpensive initial cost of manufacture and low maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a longitudinal vertical section taken substantially upon a plane passing along section line 5—5 of Figure 2 showing the structural details of the tread adjusting mechanism and the adjusted positions of the tread;

Figure 2:
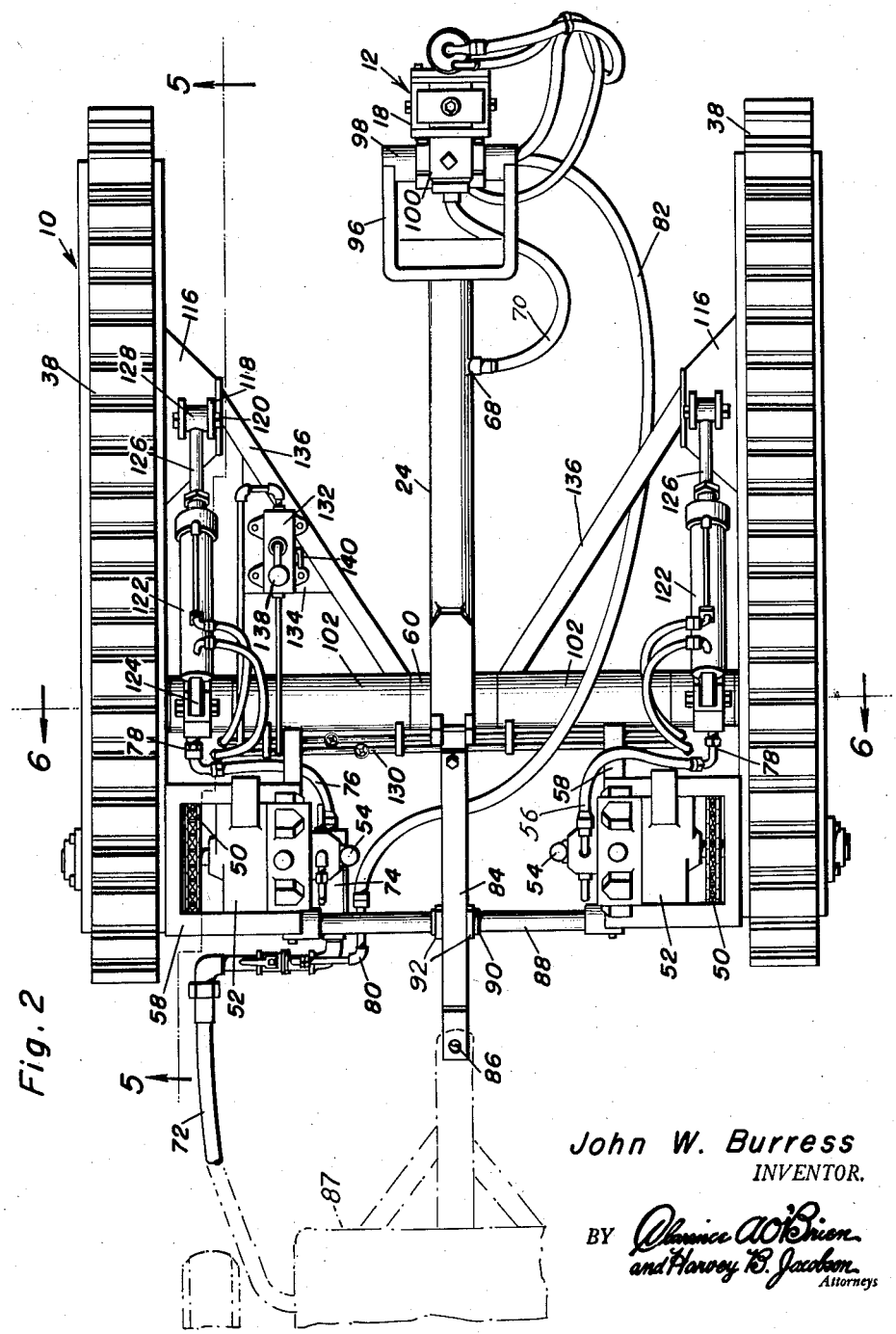
Figure 2 is a top plan view of the construction of Figure 1 showing the relationship of the endless treads and other structural features of the carriage of the present invention.
Figure 3:
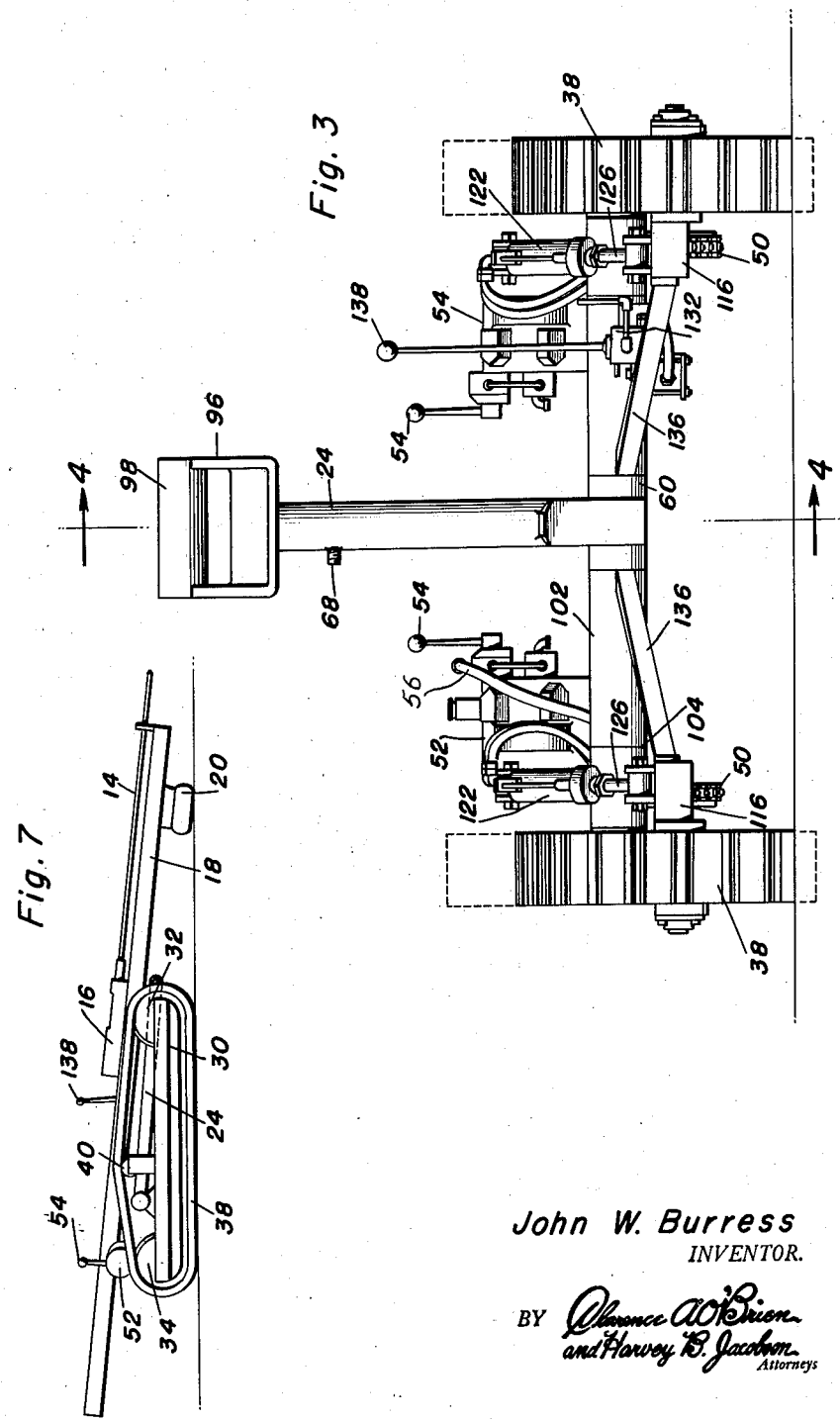
Figure 3 is a front elevational view showing the carriage of the present invention with the drill and drill control mechanism removed and showing the dotted line adjustment positions of the endless tread.
Figure 4:
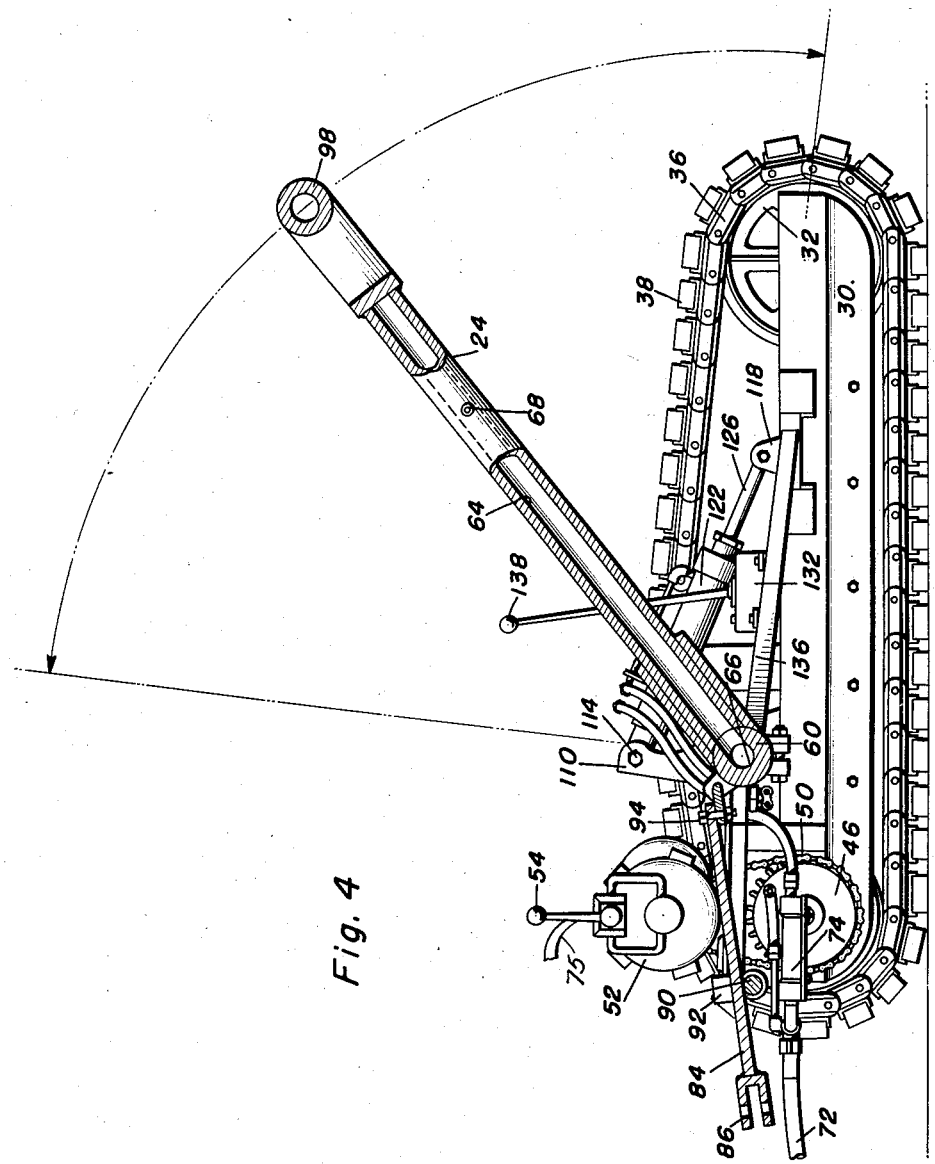
Figure 4 is a longitudinal, vertical sectional view taken substantially upon a plane passing along section line 4—4 of Figure 3 showing the structural details of the tubular axle, tubular supporting arm and other structural features.

Figure 6 is a transverse, vertical sectional view taken substantially upon a plane passing along section line 6—6 of Figure 2 showing the structural details of the tubular axle for permitting the passage of air therethrough for driving the propelling motors and the drill control motor; and Figure 7 is a schematic side elevational view showing the carriage of the present invention with the drill positioned in substantially horizontal position.

Referring now specifically to the drawings, it will be seen that the numeral 10 generally designates the wagon drill carriage of the present invention for supporting a rock drill generally indicated by the numeral 12 along with the control mechanism and the driving mechanism therefor.

The drill mechanism 12 generally includes a drill 14, a drill driving motor 16, an elongated frame member 18 having an endless chain therein for moving the drill 14 and the drill driving motor 16 for advancing the drill 14 as desired. A control motor 20 is provided for advancing the drill 14. The motor 16 for the drill 14 and the motor 20 for controlling the position of the drill 14 are driven by air from suitable flexible hoses 22. Further, a suitable control valve is provided for controlling the action of the drill and the position of the drill and the frame 18 is pivotally secured to a supporting member 24 for positioning at any position in a vertical plane wherein the drill 14 may be utilized in various positions as desired in various drilling operations.

The carriage 10 for supporting the drilling mechanism 12 includes a generally tubular, horizontally disposed, transverse axle 26 journalled in bearings 28 on the upper surface of oppositely disposed supporting frames 30. The supporting frames 30 are generally elongated and include an enlarged idler roller 32 at the forward end thereof and an enlarged driving sprocket 34 at the rear end thereof for receiving an endless tread chain 36 having traction blocks 38 thereon. The members 32 and 34 form a guide and driving means for the endless tread or track 36 having the traction blocks 38 thereon constructed of suitable resilient material and a smaller idler pulley 40 is provided for positioning centrally under the upper run of the endless tread 36 wherein the tread 36 will be driven by the sprocket 34 at the rear thereof thereby driving the carriage 10 over a ground surface. It will be understood that the tread 36 and its associated structure is provided at each end of the axle 26. The axle 26 is provided at each end with a cap 42 for securing the bearings 28 on the end of the axle 26.

Figure 1:
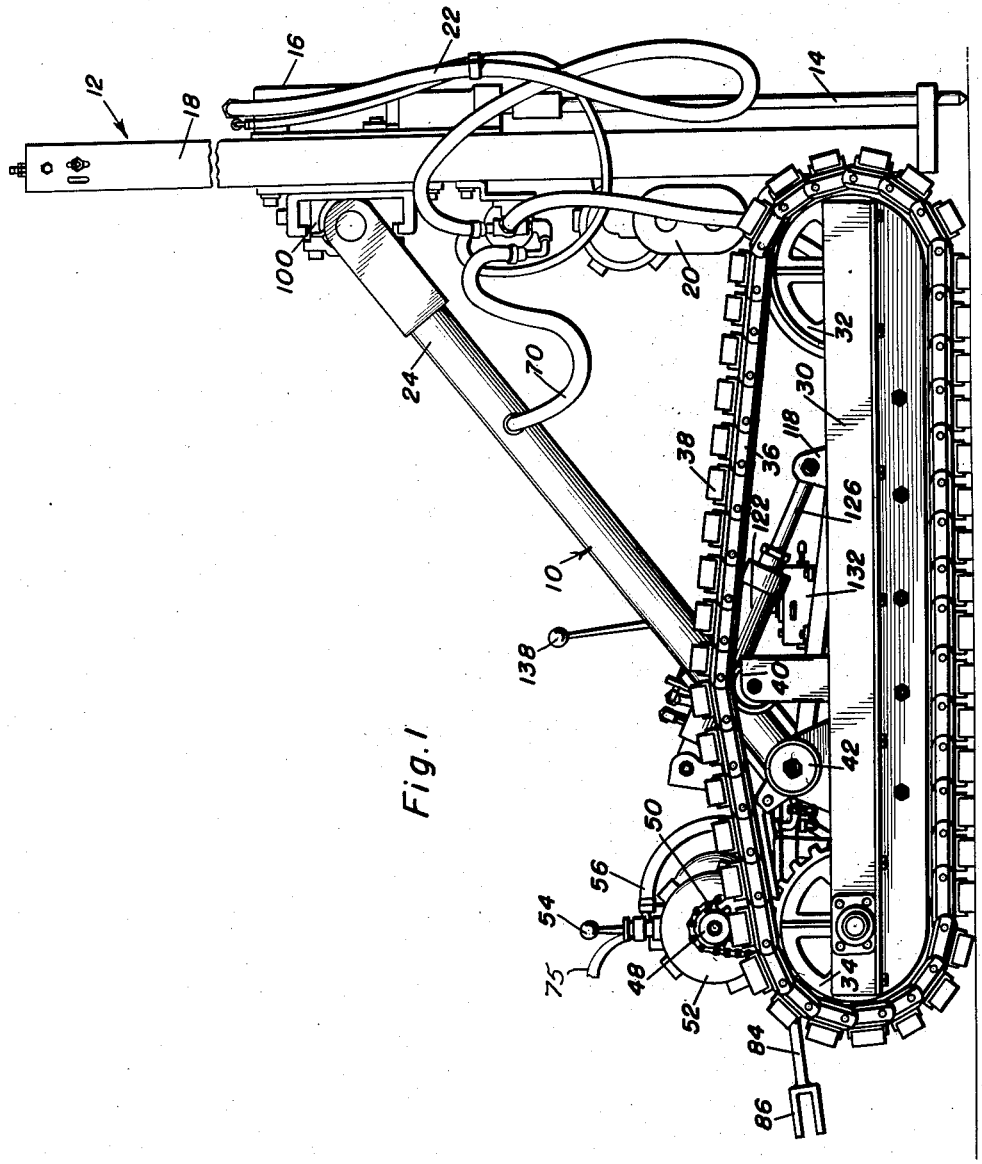
Figure 1 is a side elevational view showing the drill carriage of the present invention with the drill and control mechanism mounted thereon.

Each of the sprockets 34 is provided with an inwardly extending shaft 44 having an enlarged sprocket gear 46 on the end thereof that is in alignment with a smaller drive sprocket 48. A sprocket chain 50 encircles the smaller drive sprocket 48 and the enlarged sprocket 46 that is secured to the shaft 44. The sprocket 48 is secured to the drive shaft of an air motor 52 having a control valve 54 and an inlet conduit 56 (see Figure 1) is connected to one motor wherein the air motor 52 is driven thereby driving the tread 36. An air motor 52 is positioned at each side of the carriage 10 and is mounted on suitable brackets 58. The two air motors 52 drive the tread 36 in independent relation and individually of each other wherein by manipulation of the control valve 54, the direction of movement of the carriage 10 may be easily guided, reversed, changed or the like.

The tubular axle 26 is provided with an enlarged central portion 60 that has a pair of lugs 62 extending from on side thereof and the drill carriage support 24 extends integrally therefrom and the support member 24 is provided with a longitudinal passage 64 that is in communication with the tubular passage 66 in the center of the tubular axle 26. Adjacent the outer end of the drill support 24 is a fitting 68 that is attached to an air hose 70 for supplying the control motor 20 on the drill mechanism 18.

The entire carriage 10 is supplied with air from an air inlet line 72 that is connected with an oil cylinder 74 and the oil cylinder 74 is communicated with the interior of the tubular axle 26 by a conduit 76. The conduit 76 is attached to a fitting 78 adjacent one end of the axle and the air then proceeds through the passage 66 into the passage 64 in the support member and also passes through a fitting 78 at the other end of axle 26 into the fluid conduit 56 that supplies one of the motors 52. The other of the motors 52 for driving the tread 36 is supplied from a direct take-off 75 (see Figure 2) from the oil cylinder 74. A by-pass line 80 by-passes the oil cylinder 74 and is connected to a flexible hose 82 that supplies air for blowing out the hole that is being drilled by the drill 14. As this blow-out air is necessary and the oil that is normally in the air that passes through the oil cylinder 74 is undesirable, the air for blowing out the hole drilled by the drill is in a clean condition.

Secured between the lugs 62 on the axle 26 is a drawbar 84 having a suitable hitch 86 on the end thereof wherein an air compressor 87 (see Figure 2) having ground engaging supporting wheels may be attached thereby providing a self-propelled carriage wherein the air compressor will supply air through the inlet line 72 for driving the motors 52 and operating the drill mechanism 18.

Secured between the brackets 58 for supporting the motors 52, is a transverse rod 88 having a sliding collar 90 thereon wherein the collar 90 is provided with upstanding lugs 92 for supporting the drawbar 84 and guiding the drawbar 84 during maneuvering of the carriage 10 thereby assuring that the drawbar 84 will not become entangled with the other mechanism of the carriage 10 and assuring that the drawbar 84 will pivot about pivot bolts 94 within limits thereby retaining the compressor in the desired relation to the carriage 10.

The outer end of the support member 24 is provided with an enlarged yoke 96 having a bearing 98 for pivotally supporting a bearing 100 that supports the elongated frame 18 wherein the elongated frame 18 is adjustably secured to the support member 24 for manipulation of the drill 14 in the desired manner.

In order to retain the support arm or member 24 in a constant angular relation to the ground supporting surface, means is provided for pivoting the tracks or treads 36 about the bearing 28 on the supporting frame 30 thereby retaining the arm 24 in an angular position regardless of the terrain on which the carriage 10 is supported during the drilling and moving operation. This is accomplished by the provision of a pair of spacer sleeves 102 pivotally mounted on the axle 26 and a pair of sleeves 104 keyed to the axle 26 by a key 106 and clamp means 108. Each of the sleeves 104 is provided with an enlarged offset arm 110 having lugs 112 thereon for receiving a pivot bolt 114. Each of the tread supporting frames 30 is provided with an inwardly projecting bracket 116 having upstanding lugs 118 thereon for receiving a pivot bolt 120. A double-acting hydraulic cylinder 122 is provided with a projecting lug 124 that is pivoted on the pivot bolt 114 on the projecting arm 110. The piston has a piston rod 126 projecting from the cylinder 122 and includes a pivot lug 128 pivotally mounted on the pivot bolt 120 on the bracket 116. Each of the piston and cylinder arrangements is provided with inter-connecting conduits 130 for expanding and contracting the piston 126 in relation to the cylinder 122. A manually actuated hydraulic pump 132 is provided on a bracket 134 that is secured to a mounting arm 136 extending from the bracket 116 to the sleeve 102. It will be seen that each bracket 116 is provided with a brace arm 136 wherein the sleeves 102 will pivot with the endless tread 36. The manual hydraulic pump 132 is provided with an operating handle 138 and a control valve 140 for manipulating the expansion and contraction of the pistons 126 through suitable conduits.

The drill carriage unit 10 of the present invention includes a pair of spaced elongated frames 30, each including a movable endless crawler tread 36, each frame 30 being mounted for free pivotal movement, in a vertical plane, about the ends of a connecting axle 26 with the latter being independently rotatable with respect to the tread frames. The treads 36 are individually movable about the frames by separate driving motors 52, each being supported by and movable with the frame 30. These motors 52 may be operated independently of each other, in the same or opposite directions at varying speeds or in the same direction at a common speed, the purpose being to propel and steer the unit 10 over the ground.

Affixed at right angles to the axle 26 and midway between the spaced treads is an outwardly projecting arm 24 to the extreme end of which is detachably secured a rock drill unit 12 and it will be apparent that upon rotary movement of the axle 26 with respect to the treads 36 the arm 24 may be adjusted at any desired angle, holding the drill unit 12 in its proper drilling position.

Rotary movement of the axle 26 relative to the treads 36 is accomplished by a pair of hydraulically expansible cylinders and pistons 122 forming separate units, the cylinder of each unit being pivotally connected to an upstanding arm 124 detachably secured, in a fixed relation, to the axle 26 adjacent the tread frame 30 while the piston is connected through a piston rod 126 to a bracket 116 formed on the tread frame 30. Pressure fluid is supplied to the cylinders through hand operated pump 132 at which time there is a movement of the piston relative to the cylinder separating the two and imparting a rotary movement of the axle 26 and the arm 24. The cylinders 122 are connected in such a manner that operation of one pump serves to supply operating fluid to both cylinders. When the axle 26 has been rotated and the arm 24 positioned at the desired drilling angle a suitable hand operated valve, in a pipe connection between the two cylinders, is closed confining within the cylinders and their connections the desired amount of pressure fluid.

When the arm 24 has been adjusted to its proper drilling angle and the unit is moved over uneven ground causing the treads 36 to move up and down in their separate vertical planes, the pistons and cylinders are moved one to the other, causing a surging action or a transfer of fluid from one cylinder to the other, the result being that the arm 24 is maintained at the desired angle regardless of the positions assumed by the treads 36 in following the ground surface.

Also, it will be seen that the positioning of the treads or tracks 36 will also position the angular relation of the supporting arm 24 that is integral with the axle 26 thereby further controlling the operation of the drill supporting frame together with the drill mounted thereon.

Obviously, suitable grease fittings, lubrication lines and the like may be provided where needed and where it is deemed necessary and the particular arrangement of the air conduits may be altered as deemed necessary in order to facilitate the supply of air to the various air motors in the most efficient manner with the minimum number of long exposed air hoses thereby eliminating all possible damage to said air hoses.

In operation, the drill carriage of the present invention may be self-propelled, self-adjusted and self-operated by a single person wherein the drill carriage may proceed to the point of drilling and the drill together with the supporting frame therefor may be easily set up to the desired position and the carriage together with the drill frame maintained in a stable, rigid condition by adjusting the vertical swinging position of the tracks 36 thereby permitting the drilling operation to be conducted with a maximum of efficiency and a minimum of labor and damage to the drilling equipment.

While only air operated motors have been illustrated for operation of the drill and drill carriage, it will be understood that other sources of power may be used in some circumstances. In some drilling areas an air supply may not be readily available and it will be desirable to use other sources of power. This is especially true of drilling operations in mines where an electric supply is usually available. In this case and in other conditions, electric motors may be provided for driving the drill carriage and operating the drill.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A drill carriage comprising a transverse axle, an elongated frame member pivotally secured to each end of said axle, sprockets on each frame member, an endless flexible tread mounted on said frame members, power means for independently driving said treads, a support arm secured to said axle for adjustably supporting a drill, and means for adjusting the axle in relation to the frame members having the treads thereon, said means for adjusting the axle including an offset arm at each end of said axle, a pair of double-acting fluid actuated cylinder and piston arrangements pivotally secured at one end to said arms and at the other end to said frame members, and means intercommunicating said piston and cylinder arrangements thereby permitting swinging of the frame members about the pivotal conneciton between the frame members and the axle to different relative angular positions without changing the position of the support arm.

2. A drill carriage comprising a transverse axle, an elongated frame member pivotally secured to each end of said axle, sprockets on each frame member, an endless flexible tread mounted on said sprockets, power means for independently driving said treads, a support arm secured to said axle for adjustably supporting a drill, and means for adjusting the axle in relation to the frame members having the treads thereon, said tread driving means comprising a pair of air operated motors with one motor driving each tread and supported from the adjacent frame member, and a separate control for each motor thereby providing a control for the direction of travel of the carriage, said axle having a hollow closed passage, an air supply line admitting air into said passage at one end thereof for supplying air to one of said motors, and a hose line communicating with the air supply line for supplying air to the other of said motors.

3. A drill carriage comprising a transverse axle, an elongated frame member pivotally secured to each end of said axle, sprockets on each frame member, an endless flexible tread mounted on said sprockets, power means for independently driving said treads, a support arm secured to said axle for adjustably supporting a drill, and means for adjusting the axle in relation to the frame members having the treads thereon, said tread driving means comprising a pair of air operated motors with one motor driving each tread and supported from the adjacent frame member, and a separate control for each motor thereby providing a control for the direction of travel of the carriage, said axle having a hollow closed passage, an air supply line admitting air into said passage at one end thereof for supplying air to one of said motors, and a hose line communicating with the air supply line for supplying air to the other of said motors, said support arm pivotally supporting an elongated drill supporting frame and drill, said arm rigidly secured to said axle for movement therewith, said arm having a passage communicating with the passage in said axle for supplying air for operating and controlling the drill.

4. A drill carriage comprising a transverse axle, an elongated frame member pivotally secured to each end of said axle, sprockets on each frame member, an endless flexible tread mounted on said sprockets, power means for independently driving said treads, a support arm secured to said axle for adjustably supporting a drill, and means for adjusting the axle in relation to the frame members having the treads thereon, said tread driving means comprising a pair of air operated motors with one motor driving each tread, and a separate control for each motor thereby providing a control for the direction of travel of the carriage, said axle having a hollow closed passage, an air supply line admitting air into said passage at one end thereof for supplying air to one of said motors, and a hose line communicating with the air supply line for supplying air to the other of said motors, said support arm pivotally supporting an elongated drill supporting frame and drill, said arm rigidly secured to said axle for movement therewith, said arm having a passage communicating with the passage in said axle for supplying air for operating and controlling the drill, and a draw bar pivotally secured to said axle for attaching a power source for supplying power to the treads, said power source being a mobile air compressor for supplying air to said air supply line for the air operated motors thereby forming a self-propelled drill carriage.

5. A drill carriage comprising a transverse axle, an elongated frame member pivotally secured to each end of said axle, sprockets on each frame member, an endless flexible tread mounted on said sprockets, power means for independently driving said treads, a support arm secured to said axle for adjustably supporting a drill, and means for adjusting the axle in relation to the frame members having the treads thereon, said tread driving means comprising a pair of air operated motors with one motor driving each tread, and a separate control for each motor thereby providing a control for the direction of travel of the carriage, said axle having a hollow closed passage, an air supply line admitting air into said passage at one end thereof for supplying air to one of said motors, and a hose line communicating with the air supply line for supplying air to the other of said motors, said support arm pivotally supporting an elongated drill supporting frame and drill, said arm rigidly secured to said axle for movement therewith, said arm having a passage communicating with the passage in said axle for supplying air for operating and controlling the drill, and a draw bar pivotally secured to said axle for attaching a power source for supplying power to the treads, said power source being a mobile air compressor for supplying air to said air supply line for the air operated motors thereby forming a self-propelled drill carriage said means for adjusting the axle including an offset arm at each end of said axle, a pair of double-acting fluid actuated cylinder and piston arrangements pivotally secured at one end to said arms and at the other end to said frame members, and means for actuating said piston and cylinder arrangements thereby swinging the axle and arm about the pivotal connection with the frame members.

6. A drill carriage comprising a pair of elongated mobile frame members, a transverse axle interconnecting said frame members, said frame members being pivotally attached to said axle for free swinging movement in a vertical plane, and a drill supporting arm rigid with said axle to permit unrestricted relative movement between the drill supporting arm and the frame members, and means interconnecting the axle and each of the frame members for rotating the axle in relation to the frame members for adjusting the angular relation between the supporting arm and the frame members, said means interconnecting the axle and each of the frame members being connected with each other and maintaining the position of the arm while permitting the frame members to swing about the axle to different relative angular positions 7. A drill carriage comprising a pair of elongated mobile frame members, a transverse axle interconnecting said frame members, said frame members being pivotally attached to said axle for free swinging movement in a vertical plane, and a drill supporting arm rigid with said axle to permit unrestricted relative movement between the drill supporting arm and the frame members, and means interconnecting the axle and each of the frame members for rotating the axle in relation to the frame members for adjusting the angular relation between the supporting arm and the frame members, said means interconnecting the axle and each of the frame members being connected with each other and maintaining the position of the arm while permitting the frame members to swing about the axle to different relative angular positions, said frame members including a movable endless crawler tread, and means for independently driving said treads at varying speeds for controlling the direction of movement of the carriage.

8. A drill carriage including a pair of ground engaging traction devices and a transverse axle having its end portions rotatably mounted in said devices, said devices swingable in separate planes vertical to said axle, a drill supporting arm rigidly attached to said axle and swingable about the longitudinal axis of the axle upon rotation of the axle, fluid actuated means connecting said devices with the axle rotating the same relative to said devices adjusting the angularity of the arm to the ground over which the carriage moves, conduits connecting said fluid actuated means for the transfer of fluid from one to the other moving said devices in opposite directions during movement of the carriage over uneven ground without imparting rotary movement to said axle, and a valve within said conduits for interrupting the transfer of fluid holding said axle and traction devices against respective movement.

9. A drill carriage including a pair of ground engaging traction devices and a transverse axle having its ends journaled in said devices, said devices swingable in separate planes about the axle, a drill supporting arm rigidly connected with the axle and swingable in an arc about the longitudinal axis of the axle, intercommunicated fluid actuated means connecting each of said traction devices with the axle for rotating the same to adjust the angularity of the arm to the ground, the intercommunication of said means permitting movement of said traction devices when moving over uneven ground without effecting the preadjusted angularity of the arm, said fluid actuated means including a control element for rendering the same inoperative holding said traction devices and axle against relative movement.

10. A drill carriage including a pair of traction devices and a transverse axle rotatably journaled within said devices holding the same in spaced relation, said devices movable up and down in separate planes about the axle, a drill supporting arm rigid with the axle and swingable in an arc about the longitudinal axis of the axle upon rotation of the same, a fluid actuated unit connecting each traction device with the axle rotating the same relative to the traction devices to adjust the angularity of the arm to the surface over which the carriage travels, said fluid actuated units being communicated with each other for holding the arm in its adjusted position during the up and down movement of said devices when moving over an uneven surface, and said fluid actuated units including means for rendering said units in operative holding said arm and traction devices in fixed relation.

11. A drill carriage including a pair of ground engaging traction devices and a transverse axle having its ends rotatably mounted in said devices, said devices swingable in separate planes vertical to said axle, a drill supporting arm rigid with said axle and swingable about the longitudinal axis of the axle upon its rotation, fluid actuated means connecting each of said devices with the axle rotating the same relative to said devices to adjust the angularity of the arm in relation to the ground over which the carriage moves, said fluid actuated means being communicated with each other for holding the arm against movement from its preadjusted position during swinging movement of said devices when moving over uneven ground, and control means included within said fluid actuated means for rendering said means inoperative locking said arm and traction devices against relative movement.

12. A drill carriage including a pair of ground engaging traction devices and a transverse axle having its ends journaled in said devices, said devices swingable up and down in separate planes about the axle, power means for independently driving said devices, a drill support fixed to said axle, means for rotating said axle to preadjust the angularity of the drill support with respect to the ground, said means including a pair of double acting fluid actuated cylinder and piston arrangements pivotally connected at one end to said axle and at the other end to said devices, and means intercommunicating said piston and cylinder arrangements permitting swinging of said devices about the axle to different relative angular positions without changing the angularity of the drill support.

References Cited in the file of this patent
UNITED STATES PATENTS

| | | |
|---|---|---|
| 1,429,474 | Wickersham | Sept. 19, 1922 |
| 1,535,411 | Hansen | Apr. 28, 1925 |
| 2,121,189 | Dorward | June 21, 1938 |
| 2,348,899 | Guignard et al. | May 16, 1944 |
| 2,389,558 | Slater | Nov. 20, 1945 |
| 2,434,693 | Graham | Jan. 20, 1948 |
| 2,446,242 | Orshansky | Aug. 3, 1948 |
| 2,646,968 | Curtis | July 28, 1953 |
| 2,659,583 | Dorkins | Nov. 17, 1953 |
| 2,740,618 | Snyder et al. | Apr. 3, 1956 |